United States Patent [19]

Huebscher et al.

[11] Patent Number: 5,416,873
[45] Date of Patent: May 16, 1995

[54] PROTECTOR DEVICE FOR FUSED OPTICAL FIBER JOINTS AND METHOD OF USE

[75] Inventors: Laszlo Huebscher, New Brunswick; Attila Huebscher, Somerset, both of N.J.

[73] Assignee: Advanced Custom Applications, Inc., Belle Mead, N.J.

[21] Appl. No.: 238,395

[22] Filed: May 5, 1994

[51] Int. Cl.$^6$ .................................................. G02B 6/38
[52] U.S. Cl. ........................................ 385/99; 385/95; 385/96
[58] Field of Search ................. 385/99, 95, 96, 97, 385/98, 134, 80, 81; 156/158

[56] References Cited

U.S. PATENT DOCUMENTS

| | | | |
|---|---|---|---|
| 5,029,972 | 7/1991 | Lukas et al. | 385/95 |
| 5,042,902 | 8/1991 | Huebscher et al. | 385/95 |
| 5,367,594 | 11/1994 | Essert et al. | 385/99 X |

*Primary Examiner*—Rodney B. Bovernick
*Assistant Examiner*—Phan T. H. Palmer
*Attorney, Agent, or Firm*—Caesar, Rivise, Bernstein, Cohen & Pokotilow, Ltd.

[57] ABSTRACT

A device and method of use for a fused joint between a pair of optical fibers. The device comprises a housing having a longitudinal axis and a generally U-shaped compressible adhesive strip located within the housing. The housing comprising a pair of elongated trough shaped sections pivotally connected to each other by a longitudinal hinge assembly. The adhesive strip is secured to the inner surfaces of the housing sections and includes an adhesive outer surface. The housing sections are temporarily held in an open position by cooperating members of the hinge so that the fused joint and contiguous sections, e.g., buffers, of the optical fiber can be inserted within the housing between portions of the adhesive outer surface of the strips. The housing are pivotable together so that housing sections assume a closed position, whereupon portions of the strip which are contiguous with the splice joint and the buffers are compressed to accommodate the splice joint and buffers. When so closed, portions of adhesive outer surfaces of the strips abut each other and other portions engage the splice joint and buffers to adhesively secure the splice joint and buffers to the strips and the strips to each other. Plural hooks are provided along the top edge of one of the housing sections to engage latch surfaces of the other housing section to permanently holding the housing sections closed, thereby permanently sealing the joint within the housing.

17 Claims, 3 Drawing Sheets

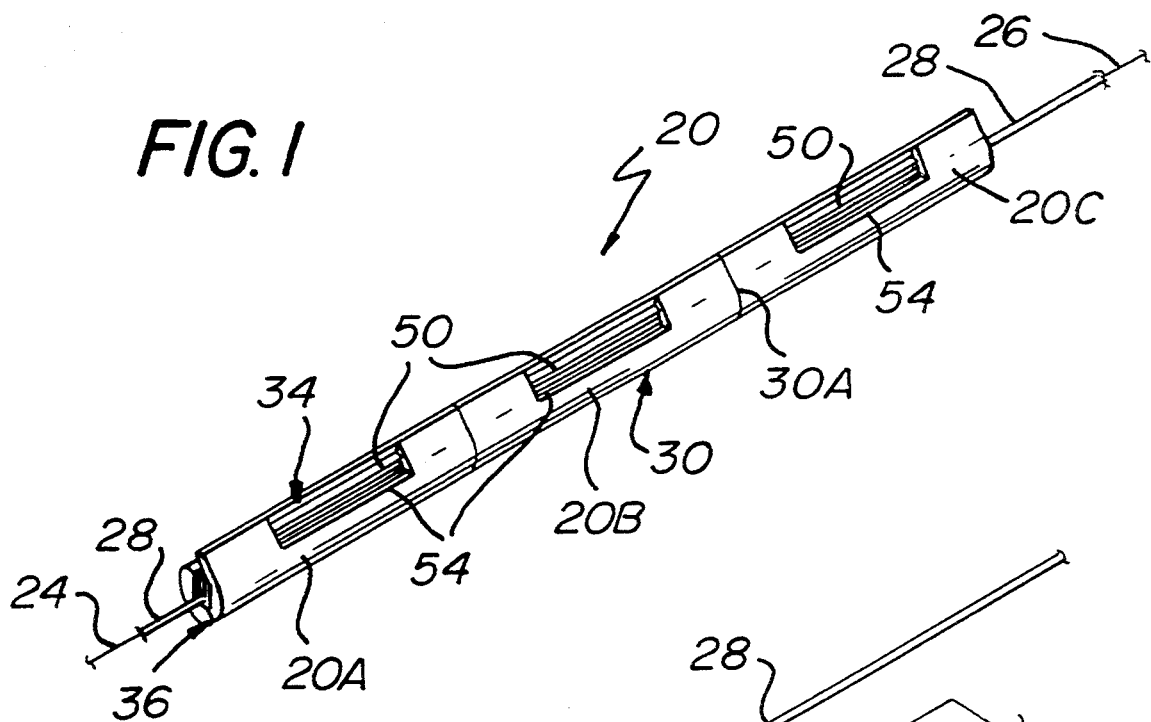
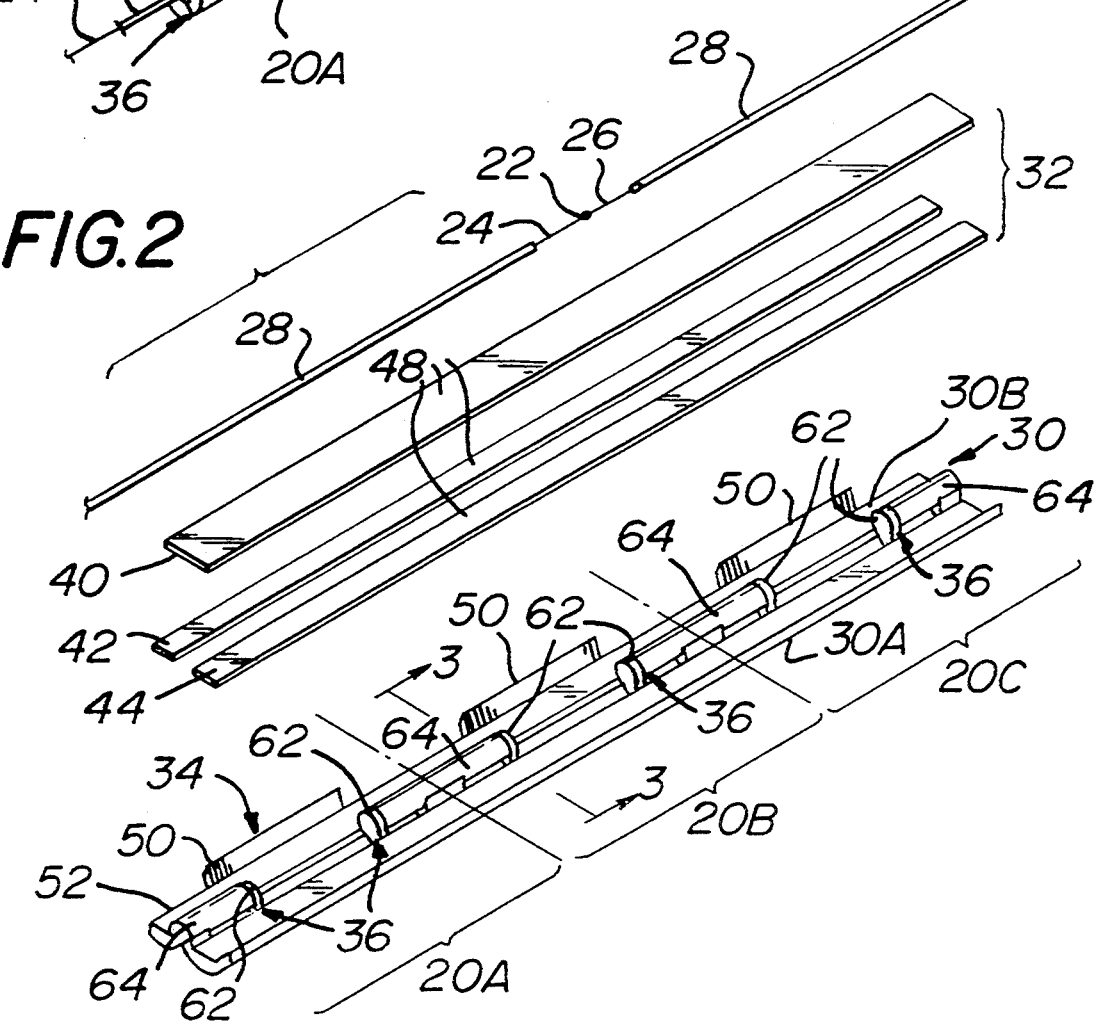

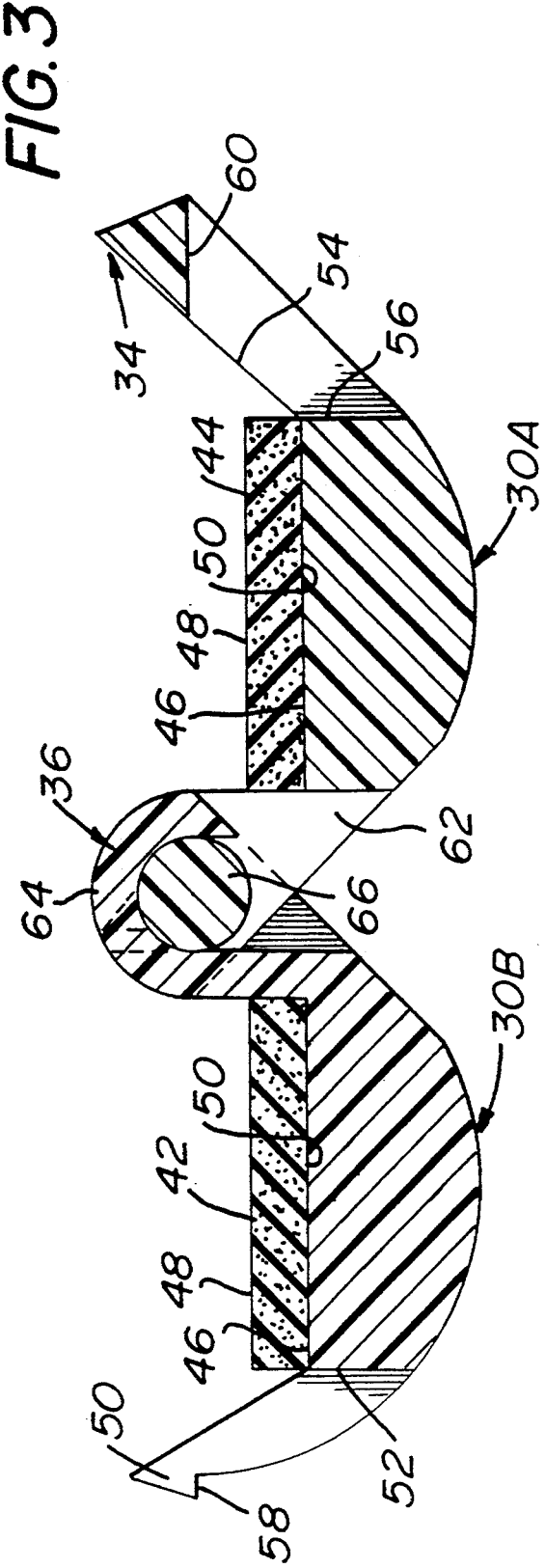
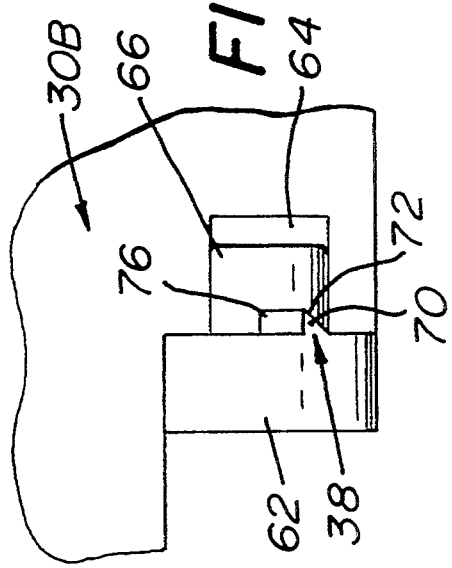
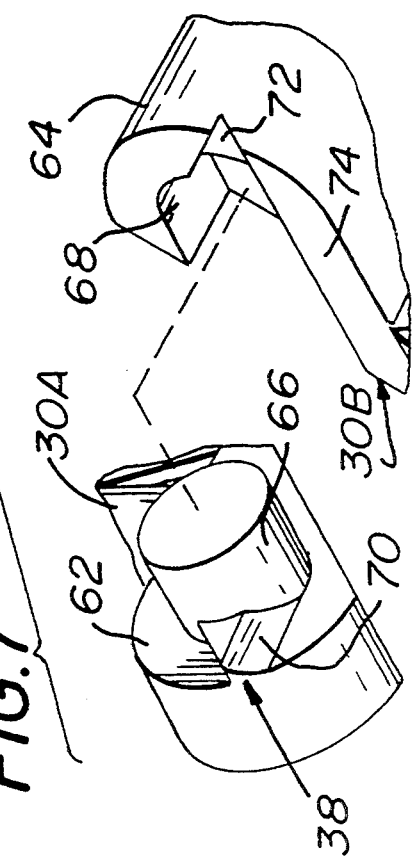

PROTECTOR DEVICE FOR FUSED OPTICAL FIBER JOINTS AND METHOD OF USE

BACKGROUND OF THE INVENTION

This invention relates generally optical fibers and more particularly to devices and methods of use for protecting the spliced, e.g., fused, ends of a pair of optical fibers.

Optical fibers are widely employed and are optical wave-guides with an inner glass core having a refractive index which exceeds that of a surrounding cladding layer and are capable of conducting an optical ray by means of total internal reflection or guiding.

Mechanical devices are currently available for providing mechanical and environmental protection to a set or sets of optical fibers which have been stripped of their cladding, cleaved, and fused into a continuous length. Two types of mechanical devices are currently available. One type of device comprises an elongated heat shrinkable plastic tube, an elongated hot-melt adhesive tube, and an elongated strengthening member. The hot-melt adhesive tube and the strengthening member are disposed side-by-side within the plastic tube. Prior to making the splice between the fibers, i.e., fusing the cleaved fiber ends, the heat-shrink tube is threaded onto one of the fibers remote from the splice region, with the fiber extending through the hot melt adhesive tube. After the fiber ends are fused the heat-shrink tube is moved into position over the splice joint so that the splice joint is within the hot melt adhesive tube. The heat-shrink tube is then exposed to localized heat to cause the hot-melt adhesive to flow around the splice and the heat shrink tube to shrink into contact therewith to intimately encircle the fused joint and thereby protect it.

Another type of mechanical device is the so-called clam shell device. This device comprises a pair of plates that are hinged together along one edge thereof. Either or both of the plates may be provided with a pair of axially aligned recesses or grooves in its inner surface to receive the buffers of the spliced optical fibers. The inner surface of each plate includes a thin adhesive layer thereon. Thus, after the fused splice is located so that its buffers are within the pair of aligned recesses the two plates are closed together, i.e., pivoted toward each other, to cause the adhesive on their inner surfaces to engage each other, thus holding the device closed to enclose the fused joint and thereby protect it.

While the prior art splice protectors are generally suitable for their intended purposes, they nevertheless suffer from one or more of the following disadvantages, complexity of use, inability to be accommodate various sizes of optical fibers with a single protector, long-term reliability.

OBJECTS OF THE INVENTION

Accordingly, it is a general object of this invention to provide apparatus and a method for use for protecting the spliced ends of a pair of optical fibers which overcomes the disadvantages of the prior art.

It is another object of the present invention to provide a device which is easy to use and effective for protecting the spliced the ends of a pair of optical fibers.

It is still another object of the present invention to provide a device for protecting the spliced ends of a pair of optical which is simple in construction, compact in size, and relatively low in cost.

SUMMARY OF THE INVENTION

These and other objects of the instant invention are achieved by providing a device and method of use for a spliced joint between a pair of optical fibers, e.g., buffered fibers. Each of the fibers has an end face, with end faces being secured to each other, e.g., fused, by the joint. The device comprises a housing having a longitudinal axis, latching means, and compression means.

The housing comprises a pair of elongated trough shaped sections which are pivotally connected to each other parallel to the longitudinal axis of the housing, e.g., by a hinge assembly located along the lower edge of each of the sections. Each of the housing sections has an inner surface. The compression means comprises at least one elongated strip of a compressible material secured to the inner surfaces of the housing sections. The strip of compressible material has an outer surface, e.g., an adhesive thereon.

The housing sections are held in an open position, e.g., by temporary restraining means, whereupon the splice joint can be inserted within the housing between portions of the outer surface of the strip. The housing sections are pivotable with respect to each other so that then can be pivoted to a closed position, whereupon the latching means operates to hold those sections closed and with the first portions of the compressible strip which are contiguous with the splice joint being compressed thereby to accommodate the splice joint between them. Second portions of the outer surface of the strip abut each other, e.g., adhesively secure such second portions together. These actions cause the splice joint and contiguous portions of the optical fibers and buffers to be permanently secured between abutting portions of the strip with the housing sections permanently secured together in the closed position to prevent the housing from accidentally opening.

In accordance with a preferred aspect of this the latching means which comprises at least one hook located adjacent the top edge of one of the housing sections and at least one latch surface located adjacent the top edge of the other of the housing sections. The hook is arranged to engage the latch surface when the housing sections are closed.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is an isometric view of the splice protector of the subject invention shown in its permanently closed position protecting the joint between the ends of a pair of optical fibers:

FIG. 2 is an exploded isometric view showing the various components making up the splice protector shown in FIG. 1;

FIG. 3 is a greatly enlarged sectional view taken along line 3—3 of FIG. 2 and showing the splice protector in a initially open position just after the components of the splice protector have been assembled;

FIG. 6 sectional view taken along line 6—6 of FIG. 5 and showing a portion of one hinge of the device with its means for holding the housing sections in the temporarily open (ready) position; and FIG. 7 is an exploded isometric view of the portion of the hinge shown in FIG. 6.

DETAILED DESCRIPTION OF THE PREFERRED EMBODIMENT

Figure 4:
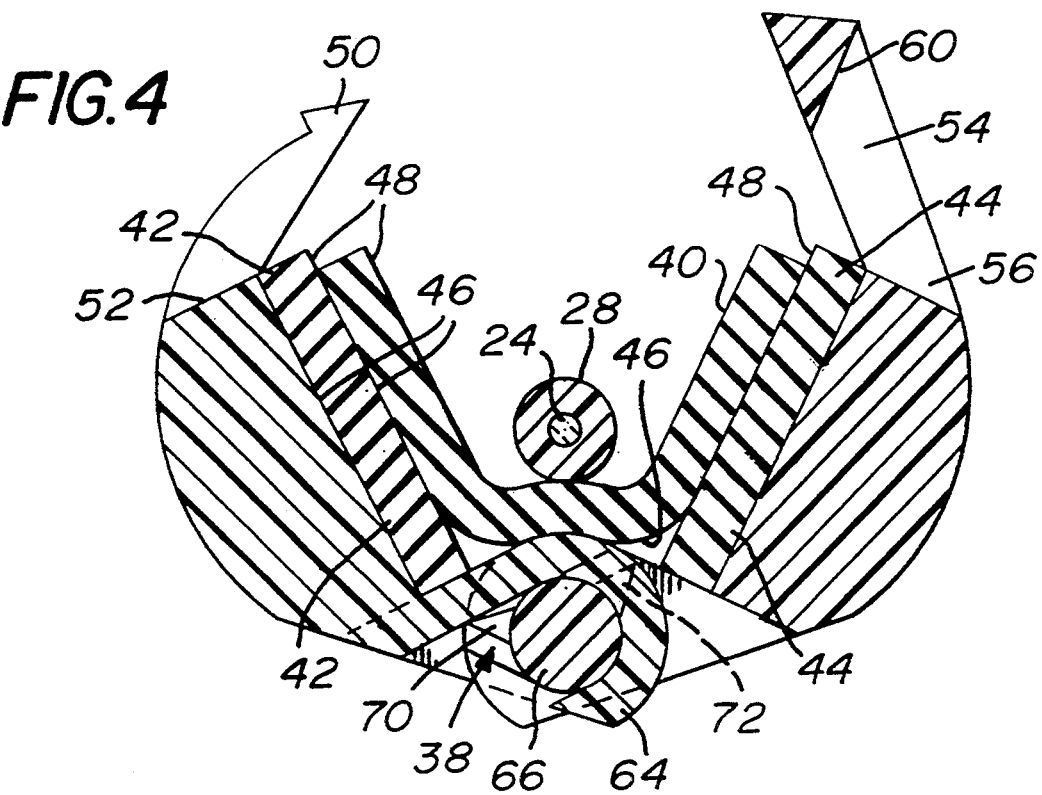
FIG. 4 is a sectional view like that of FIG. 3 but showing the splice protector in its "ready" (temporarily) open position, wherein the splice protector is ready to receive the spliced optic fibers therein.

Referring now to various figures of the drawing where like reference numerals refer to like parts there is shown at 20 in Fig.1 a preferred embodiment the splice protector device of the subject invention. The splice protector device 20 is arranged to receive, hold, and isolate the joint 22 (FIG. 2), e.g., a fused joint, connecting the ends of a pair of conventional optical fibers 24 and 26 from the ambient surroundings, thereby protecting that joint. The optical fibers, being conventional, thus includes a buffer 28 (FIGS. 2, 4 and 5), which may be of any suitable size and which extends along the length of the optic fiber. As is conventional, the buffer 26 is removed from the portion of the optical fiber contiguous with free end of the fiber to enable the joint to be made.

As can be seen clearly in FIGS. 1 and 2 the splice protector 20 basically comprises housing means 30, compression means 32, snap-acting latching means 34, hinge means 36, and temporary restraining means 38 (FIGS. 4–7). The housing means comprises a pair of housing sections 30A and 30B, each of which is an elongated, e.g., 60 mm, generally trough shaped member formed, e.g., plastic injection molded of any suitable material, e.g., Liquid Crystal Polymer (LCP). The hinge means 36 comprises plural hinges (to be described later) formed integrally with extending along the bottom of the housing sections 30A and 30B parallel to their longitudinal axis to pivotally connect them together in a "clamshell" -like arrangement. When the two housing sections are first connected together by the hinge means they are generally free to pivot somewhat with respect to each other and can be laid flat like shown in FIGS. 2 and 3 so that the compression means can be secured thereto.

As can be seen clearly in FIG. 2 the compression means 32 comprises plural elongated strips 40, 42, and 44 of a compressible, flexible material. Each of the elongated strips is a thin, e.g., 0.4 mm, generally planar member which includes an adhesive inner surface 46 and an adhesive outer surface 48. In a preferred embodiment of this invention the material is a plastic foam tape, such as sold by Minnesota Mining & Mfg. Co (3M) under the trade designation 4920. The strips 42 and 44 are secured by their adhesive inner surfaces 46 to the generally planar inner surfaces 50 of the housing sections 30B and 30A, respectively, so that their adhesive outer surfaces 48 are exposed.

As can be seen in FIG. 3 when the strips 42 and 44 are in place the hinge means 36 extends between the strips. The strip 40 constitutes a bridging strip which is similar to strips 42 and 44, but is wider so that it can be disposed over and cover virtually all of the strips 42 and 44 (and the interposed hinge means 36). When so disposed the adhesive inner surface 48 of the bridging strip 40 abuts the adhesive outer surface 48 of the strips 42 and 44, and also abuts the outer surface of the interposed hinge means 36 to secure the strip 40 in place, with its outer surface 48 exposed.

Once the strips are in place as just described the assembly of the components making up the splice protector device 20 is completed. In order to ready the device for receipt of the optical fiber joint therein the housing sections 30A and 30B are pivoted together to a temporarily open or "ready" position like that shown in FIG. 4. As will be described in detail later the temporary restraining means 38 serves to hold the two housing sections in the ready position to receive the optical fiber joint therebetween.

As can be seen in Fig. 4 when the housing sections are in the ready position the bridging strip is bent into a generally U-shaped configuration to receive the joint 22 and contiguous portions of the optical fibers 24 and 26 in the interior of thereof. This is accomplished by placing the joined optical fibers on the adhesive outer surface 48 of the bridging strip at the fold or center thereof and with the joint 22 being located at approximately the midpoint along the length of the housing (see FIG. 2). This action temporarily holds the fibers in place. The two housing sections can then be pivoted together to the closed position shown in Figs. 1 and 5 by use of a vice-like tool (not shown) so that the housing sections are squeezed together along their entire length while the optical fibers are held by the tool. If the housing sections are relatively short, like those which will be described later, they may be pivoted together manually without the use of the vice-like tool. In any case once the housing sections assume the closed state, the latching means 34 operates to secure the two sections together in that state.

Figure 5:
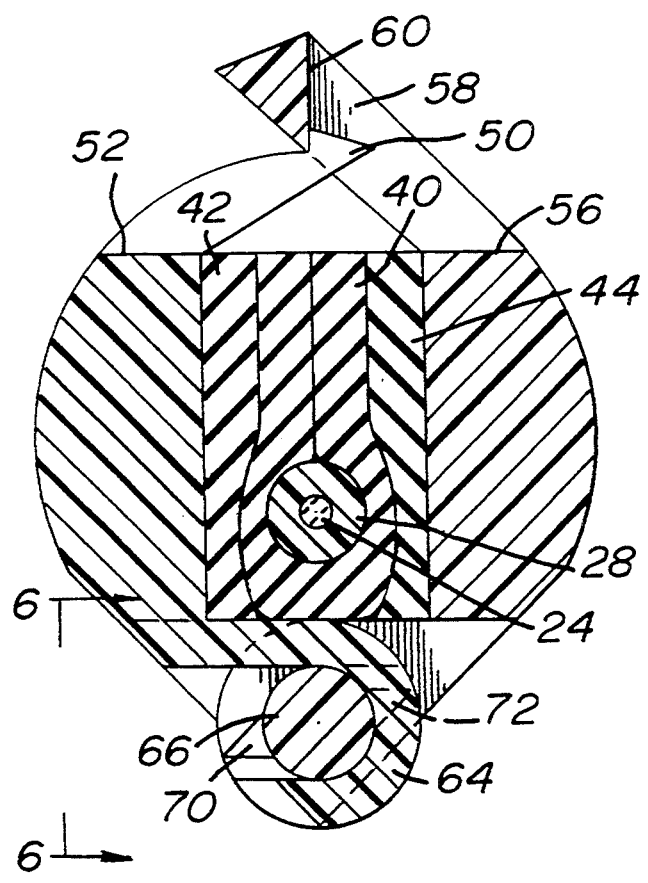
FIG. 5 is a sectional view like that of FIG. 4 but showing the splice protector in its permanently secured or closed position wherein the spliced optic fibers are sealed within the protector.

As can be seen in FIG. 5 when the housing sections are closed the portions of the bridging strip 40 abutting the interposed joint and contiguous portions of the optic fibers are compressed to accommodate those portion of the optic fibers therebetween as shown in FIG. 5. Depending upon the outer diameter of the optical fiber's buffer 28, the underlying strips 42 and 44 may also be compressed as shown in FIG. 5. Since the outer surface 48 of the bridging strip is adhesive, the portions of that strip which abut the interposed portions of the optical fibers adhesively engage those interposed portions to secure the optical fiber joint in place with respect to the housing. Moreover, the remaining outer adhesive surface portions 48 of the bridging strip 40 engage each other as shown in FIG. 5 to secure those portions together, thus further enhancing the securement of the two housing sections together.

As should be appreciated by those skilled in the art these actions have the effect of encapsulating and sealing the spliced joint 22 and contiguous portions of the optical fibers between the abutting portions of the bridging strip within the interior of the housing, thereby protecting those components from the ambient surroundings and potential injury.

As should also be appreciated by those skilled in the art that the use of the three compressible adhesive strips 40, 42, and 44, with the strip 40 bridging the strips 42 and 44 ensures that only a minimal thickness of adhesive strip overlies the hinge assembly, thereby providing minimal interference to easy closing of the housing. It should, however, be appreciated that only one strip may be used if the strip is constructed so that its central portion is sufficiently thin to enable unfettered pivoting of the housing sections, while its outer portions are sufficiently thick to accommodate the compression thereof caused by the buffers of the optical fibers. In fact in some cases, e.g., where the optical fibers are bare or unbuffered, only a single strip of uniform thickness may be required to accommodate the amount of compression thereof caused by the optical fiber, while enabling unimpeded pivoting of the housing sections to be accomplished.

In accordance with a preferred embodiment of this invention the adhesive used for the outer and inner surfaces of the strips 40–44 is permanent so that the adhesively abutting outer surface portions of the bridging strip permanently hold the housing sections in the closed position to prevent the housing from accidentally opening. Moreover, a plastic cover sheet (not shown) is provided over the outer surface 48 of the bridging strip to protect it until the device is ready for use. At that time the cover sheet is removed to expose the adhesive exterior surface.

Referring to FIGS. 1, 4, and 5 the details of the latching means will now be described. As can be seen therein the latching means comprises a plurality of hook-like projections 50 located at spaced locations along the top edge 52 of the housing section 30B and a plurality of latch openings 54 located at similarly spaced locations below the top edge 56 of the housing section 30A. Each of the openings 54 is tapered and is sized to receive a respective one of the hook-like projections 50 of the housing section 30B therein so that the undersurface 58 of each hook-like projection engages an inclined surface 60 of the associated opening 54, thereby locking the two housing sections together as shown in FIG. 5.

Referring now to FIGS. 3–7 the details of the hinge means 36 will now be described. As can be seen therein the hinge means comprise plural hinge assemblies extending along the bottom edges of the two housing sections 30A and 30B. Each hinge assembly comprises a hinge pin projection 62 and a hinge pin support tab 64. The hinge pin projection 62 is a short member formed integrally with the housing section 30A and extends inwardly from the bottom edge thereof. The projection 62 includes a short cylindrical hinge pin 66 which projects perpendicularly thereto so that the pin is coaxial with the longitudinal axis of the splice protector device 20. The hinge support tab 64 is an elongated member formed integrally with the housing section 30B and projects outward from the bottom edge of the housing section and extends parallel the longitudinal. Each of the hinge support tabs 64 located at the ends of the housing section 30B includes a recess 68 therein. The other hinge support tabs 64 include a pair of identical recesses 68, one in each of their ends. Each recess 68 includes a circular central portion whose inner diameter is approximately equal to the outer diameter of the hinge pins 66 so that each recess can receive an associated hinge pin therein. With the hinge pins 66 of the housing section 30A located within their associated recesses 68 in the housing section 30B the housing sections are pivotally connected together and can pivot about the axis extending centrally through the aligned pins. The hinge support tabs prevent the hinge pins from sliding out of their associated recesses.

The temporary restraining means is best seen in FIGS. 6 and 7 and basically comprises a respective wedge shaped finger 70 projecting outward from each hinge pin 66 at the interface of the hinge pin and its mounting projection 62. A matingly shaped notch 72 is provided in the end face 74 of the hinge support tab 64.

A cam surface 76 leads to the notch 74 to enable the finger to ride easily up on the cam surface as the housing sections are pivoted from their fully open position shown in FIGS. 2 and 3, to the ready position shown in FIG. 4, whereupon the finger 70 enters the notch 72. This action holds the two housing sections in the ready position to prevent accidental opening to the position shown in FIG. 3 before the joined optical fibers are inserted therebetween, since such accidental opening could result in the accidental disassembly of the components of the device.

After the optical fibers are in place, as described heretofore, the two housing sections can be pivoted together by applying a squeezing force thereon, whereupon the finger 70 exits the notch 72. When the hook engages the latch surface the housing is closed and cannot be reopened.

It must be pointed out at this juncture that the use of an adhesive on the outer surface of the compressible strips, while desirable for some applications, is not mandatory. Thus, for most applications the outer surface of the strips need not include any adhesive, since the latching action of the latching means is sufficient to permanently lock the two housing sections together, with the fiber optic joint still being surrounded or encapsulated by the compressed strips.

It should also be pointed out at this juncture that the splice protector device shown herein preferably comprises three identical, modular, serially disposed portions 20A, 20B, and 20C, which are molded as an integral unit. This is only one example of a splice protector device constructed in accordance with this invention. Thus, the device 20 can be fabricated in any length desired for a particular application. For example, if a device is desired to be 20 mm long its housing can be molded so that it only includes one portion 20A. If the device is to be 40 mm long its housing can be molded so that it includes two portions 20A and 20B. Obviously, devices longer than the exemplary 60mm device can be fabricated by molding the housing sections to include more than the three portions 20A, 20B, and 20C.

While the splice protector device 20 has been described and shown for protecting the joint between a pair of buffered optical fibers, the device can be used in other applications. To that end the device can be used with single fibers, any combination of 250 to 900 micron buffers, or multi-fiber fused joints (e.g., a 4 fiber ribbon).

Without further elaboration the foregoing will so fully illustrate our invention that others may, by applying current or future knowledge, adopt the same for use under various conditions of service.

We claim:

1. A protector device for a spliced joint between a pair of optical fibers, each of said fibers having an end face, said end faces being secured to each other by said joint, said device comprising a housing having a longitudinal axis and compression means located within said housing, said housing comprising latching means, and first and second elongated trough shaped housing sections which are pivotally connected to each other parallel to said longitudinal axis, each of said sections having an inner surface, said compression means comprising at least one elongated strip of a compressible material secured to said inner surfaces of said housing sections and having an outer surface, said housing sections being arranged to be disposed in an open position, whereupon said splice joint can be inserted within said housing between portions of said outer surface of said strip, said housing sections being pivotable to a closed position, whereupon first portions of said strip which are contiguous with said splice joint are compressed to accommodate said splice joint therebetween and with second portions of said outer surface of said strip abutting each other, whereupon said splice joint is secured between said first and second portions of said strip, said latching means mechanically latching said housing sections together in said closed position to permanently holding said housing sections in said closed position and thereby prevent the housing from accidentally opening.

2. The device of claim 1 wherein each of said elongated trough shaped housing sections comprises an upper edge and a lower edge, with said housing sections being pivotally connected together along their lower edges.

3. The device of claim 2 wherein said housing sections are pivotally connected together by hinge means located along said lower edges.

4. The device of claim 3, wherein said hinge means comprises at least a first projection fixedly secured to said one housing section and at least a second projection fixedly secured to said second housing section, said first and second projections pivotally engaging each other.

5. The device of claim 4 wherein said hinge means additionally comprises temporary restraining means for temporarily holding said housing sections in said open position until a force of a predetermined magnitude is applied thereto, whereupon said housing sections are caused to pivot to said closed position.

6. The device of claim 5 wherein said temporary restraining means comprises a recess in one of said first and second projections and a cooperating member extending from the other of said first and second projections for entry into said recess.

7. The device of claim 1 wherein said outer surface of said strip comprises an adhesive thereon, said adhesive aiding in the securement of said housing sections together when said housing sections are in the closed position.

8. The device of claim 7 wherein said latching means comprises at least one hook located adjacent the top edge of one of said housing sections and at least one latch surface located adjacent the top edge of the other of said housing sections, said hook being arranged to engage said latch surface when said housing sections are closed.

9. The device of claim 7 wherein said compression means comprises a bridging strip of a general U-shape when said housing sections are in said open position and a pair of planar strip interposed between portions of said U-shaped bridging strip and respective ones of said housing sections, each of said strips having an adhesive outer surface.

10. The device of claim 9 wherein said bridging strip is flexible so that it does not interfere with the pivoting of said housing sections.

11. The device of claim 7 wherein each of said optical fibers includes a buffer, with said strips being sufficiently thick to accommodate said buffers therebetween when said housing is closed, whereupon said portions of said adhesive outer surface of said strip abut each other and engage said buffers and contiguous portions of said optical fibers therebetween to adhesively secure said buffers and said contiguous portions of said optical fibers to said strip.

12. The device of claim 1 additionally comprises temporary restraining means for temporarily holding said housing sections in said open position until a force of a predetermined magnitude is applied thereto, whereupon said housing sections are caused to pivot to said closed position.

13. The device of claim 1 wherein said latching means comprises at least one hook located adjacent the top edge of one of said housing sections and at least one latch surface located adjacent the top edge of the other of said housing sections, said hook being arranged to engage said latch surface when said housing sections are closed.

14. A method for protecting a spliced joint of a pair of optical fibers, each of said fibers having an end face, said end faces being secured to each other at said joint, said method comprising providing a device comprising a housing having latching means, a longitudinal axis, and compression means located within said housing, said housing comprising first and second elongated trough shaped housing sections which are pivotally connected to each other parallel to said longitudinal axis, each of said sections having an inner surface, said compression means comprising at least one strip of a compressible material secured to said inner surfaces of said housing sections, said strip having an outer surface, said method comprising temporarily holding said housing sections in an open position, inserting said splice joint within said housing between portions of said outer surface of said strip, applying a force to said housing sections to cause said sections to pivot to a closed position, whereupon said latching means latches to hold said sections together and with said first portions of said outer surface of said strip which are contiguous with said splice joint being compressed to accommodate said splice joint therebetween, and with second portions of said outer surface of said strip abutting each other, whereupon said housing sections are permanently held in said closed position with said splice joint interposed therebetween to prevent the housing from accidentally opening.

15. The method of claim 14 wherein said outer surface of said strip includes an adhesive to secure said abutting portions of said strip to each other and to secure said optical fiber joint to said strip.

16. The method of claim 14 wherein each of said optical fibers includes a buffer, and wherein said method comprises providing said device with at least one strip which is sufficiently thick to accommodate said buffers between portions thereof when said housing is closed.

17. The method of claim 15 wherein each of said optical fibers includes a buffer, and wherein said method comprises providing said device with at least one strip which is sufficiently thick to accommodate said buffers between portions thereof when said housing is closed.

* * * * *